(12) United States Patent
Bolch

(10) Patent No.: US 8,317,644 B1
(45) Date of Patent: Nov. 27, 2012

(54) PROTECTIVE COVER FOR BICYCLE DRIVE TRAIN ELEMENTS

(76) Inventor: David W Bolch, Dripping Springs, TX (US)

( * ) Notice: Subject to any disclaimer, the term of this patent is extended or adjusted under 35 U.S.C. 154(b) by 630 days.

(21) Appl. No.: 12/237,372

(22) Filed: Sep. 24, 2008

Related U.S. Application Data

(60) Provisional application No. 60/974,961, filed on Sep. 25, 2007.

(51) Int. Cl.
*B62J 13/04* (2006.01)
(52) U.S. Cl. .................. 474/146; 150/167; D12/127
(58) Field of Classification Search .............. 474/144, 474/145, 146, 147; D12/111, 114, 126, 127; 150/166–167; 280/152.1, 152.2, 288.4, 304.3; 74/608, 609, 612
See application file for complete search history.

(56) References Cited

U.S. PATENT DOCUMENTS

| | | | |
|---|---|---|---|
| 4,632,416 | A | 12/1986 | Zelenetz |
| 5,018,564 | A | 5/1991 | Anglin |
| D348,860 | S | 7/1994 | Reynolds |
| 5,520,584 | A | 5/1996 | Brown |
| 6,332,853 | B1 | 12/2001 | Bowman |

*Primary Examiner* — William E Dondero
(74) *Attorney, Agent, or Firm* — Sprinkle IP Law Group

(57) ABSTRACT

A removable, flexible cover with a single closure and without moving parts such as elastic, zippers, or ties, for enclosing a bicycle's drive train elements, thereby protecting during transport of the bicycle both the drive train and objects that otherwise would come into contact with grease or sharp components from the drive train elements.

20 Claims, 6 Drawing Sheets

PROTECTIVE COVER FOR BICYCLE DRIVE TRAIN ELEMENTS

CROSS-REFERENCE TO RELATED APPLICATIONS

This application claims the benefit of provisional patent application No. 60/974,961, filed 25 Sep. 2007 by the present inventor.

FEDERALLY SPONSORED RESEARCH

Not applicable

SEQUENCE LISTING OR PROGRAM

Not applicable

BACKGROUND OF THE INVENTION

1. Field of Invention

This invention relates to removable covers for the drive train elements of a bicycle when not in use.

2. Prior Art

Bicycles have become increasingly used in locations some distance away from owners' places of residence, requiring transport to those locations. Now commonly transported in passenger vehicles and other means of transport, bicycles have also become increasingly expensive, as have the means of transport. It would be advantageous to have a protective cover for the drive train elements of a bicycle that is quick and efficient to use to protect the drive train and objects that otherwise would come into contact with the drive train elements. Removable, flexible covers for bicycle drive trains are known, but prior art teaches covers that fail to enclose the entire drive train, have moving parts such as elastic, zippers, or ties, or require somewhat cumbersome efforts to put on and remove. Related art is:

U.S. Pat. Nos. 4,623,416, issued Dec. 30, 1986, to Scott H. Zelenetz, 5,520,584, issued May 28, 1996, to Thomas G. Brown, and U.S. Pat No. Des. 348,860, issued Jul. 19, 1994, to John S. Reynolds, which disclose pouch-like covers that fit over one side of the drive train elements of a bicycle. All contain moving parts such as elastic or ties, which could break or wear out after significant use, and none of the aforementioned inventions enclose the entire drive train.

U.S. Pat. No. 5,018,564, issued May 28, 1991, to Gregory V. Anglin et al., which discloses a cover with circular cuts with multiple closures that all must be opened and closed during the installation and removal of the cover, as well as a top opening that also must be opened and closed for installation and removal. The cover taught in the patent also includes a loop to immobilize the bicycle's rear wheel, which must be secured with yet another closure to be of benefit.

SUMMARY OF THE INVENTION

The present invention comprises a removable, flexible cover with a single closure and without moving parts such as elastic, zippers, or ties, for enclosing a bicycle's drive train, thereby protecting during transport of the bicycle both the drive train and objects that otherwise would come into contact with grease or sharp components from the drive train elements.

The flexible, removable cover can cover the drive train elements of a bicycle when the bicycle is not in use. A bicycle drive train can include elements such as a front chain ring, a chain, and a rear derailleur assembly. A bicycle drive train cover disclosed herein can be used with both wheels on or with the rear wheel removed.

In some embodiments, a bicycle drive train cover can comprise an envelope sized to enclose a bicycle drive train. This envelope is oblong shaped to accommodate the bicycle drive train (see FIGS. 1 and 2). The word oblong refers to a shape that is elongated in one dimension, deviating from a square, circular, or spherical form. This oblong envelope can therefore have a body that is elongated in one dimension, deviating from a spherical form. This body can be made from one piece of material (see FIG. 3) or two pieces of materials (see FIG. 4). The material(s) can be fabric or other flexible materials.

The oblong envelope has a front side (see FIG. 3) and a back side (see FIG. 4). The front side of the oblong envelope can be solid.

In one embodiment, the back side of the oblong envelope can have two cutouts extending from a top edge of the oblong envelope. The two cutouts can be generally U-shaped. Like the oblong envelope itself, the two (a first and a second) cutouts are configured to accommodate elements of the bicycle drive train. Thus, the two cutouts can have different configurations (e.g., size, shape, etc.).

In the case of an oblong envelope having a body that is made from two pieces of materials, the single closure of this oblong envelope can be formed by sewing or otherwise attaching the two pieces of materials together around the perimeter of the oblong envelope from an outside edge of the first cutout to an outside edge of the second cutout (see FIG. 4).

In the case of an oblong envelope having a body that is made from one piece of material, the single closure of this oblong envelope can be formed by sewing or otherwise attaching edges around the perimeter of the oblong envelope except a portion or area of the top edge between and include the first cutout to an outside edge of the second cutout (see FIG. 5).

A closure means such as hook-and-loop type fastener can be sewn or otherwise attached to the portion or area of the top edge between the two cutouts to form the single closure of the oblong envelope.

In one embodiment, the back side of the oblong envelope can have a single cutout extending from a top edge of the oblong envelope.

In the case of an oblong envelope having a body that is made from two pieces of materials, the single closure of this oblong envelope can be formed by sewing or otherwise attaching the two pieces of materials together around the perimeter of the oblong envelope from the outside of the one cutout to the edge of a hook-and-loop type fastener.

In the case of an oblong envelope having a body that is made from one piece of material, the single closure of this oblong envelope can be formed by sewing or otherwise attaching edges around the perimeter of the oblong envelope except a portion or area of the top edge, including the one cutout.

A closure means such as hook-and-loop type fastener can be sewn or otherwise attached to the portion or area of the top edge adjacent to the cutout to form the single closure of the oblong envelope.

Hook-and-loop fasteners consist of two components: typically, two lineal fabric strips (alternately round "dots" or squares) which are attached (e.g., sewn, adhered, etc.) to the opposing surfaces to be fastened. The first component features tiny hooks; the second features even smaller and "hairier" loops. When the two faces are pressed together, the hooks catch in the loops—and the two pieces fasten or bind temporarily. The strips can be separated by pulling or peeling the two surfaces apart.

In one embodiment, the closure means disclosed herein can be positioned on the interior of the front side and the back side of the oblong envelope. The single closure of the oblong envelope can create an essentially fully openable access without needing any moving parts or additional attachments.

DRAWINGS

Figures

Figure 4:
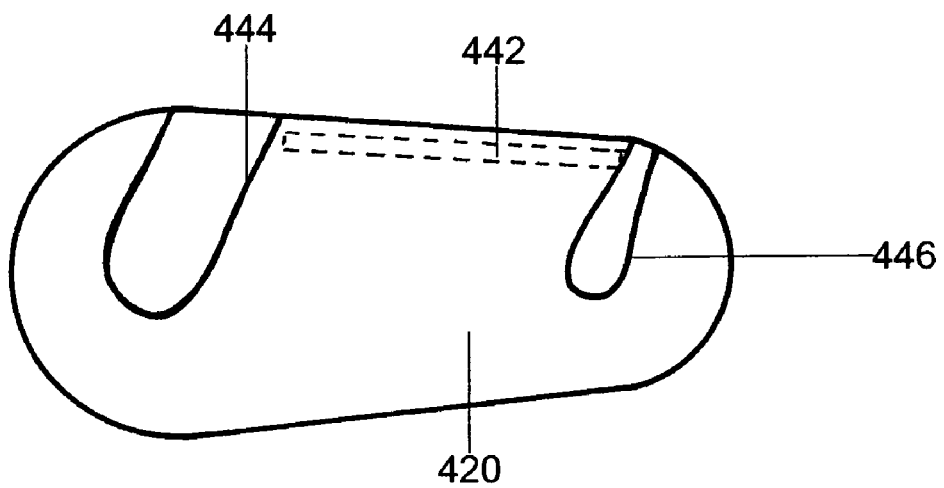

FIG. 4 is an elevational view from the back exterior side of a first embodiment of the present invention, with the dotted lines indicating where hook-and-loop type fastener would be sewn or otherwise attached to the interior of the cover and showing the U-shaped cutouts which allow the cover to slide easily around the front chain ring and rear derailleur assembly to enclose the drive train elements completely.

Figure 5:
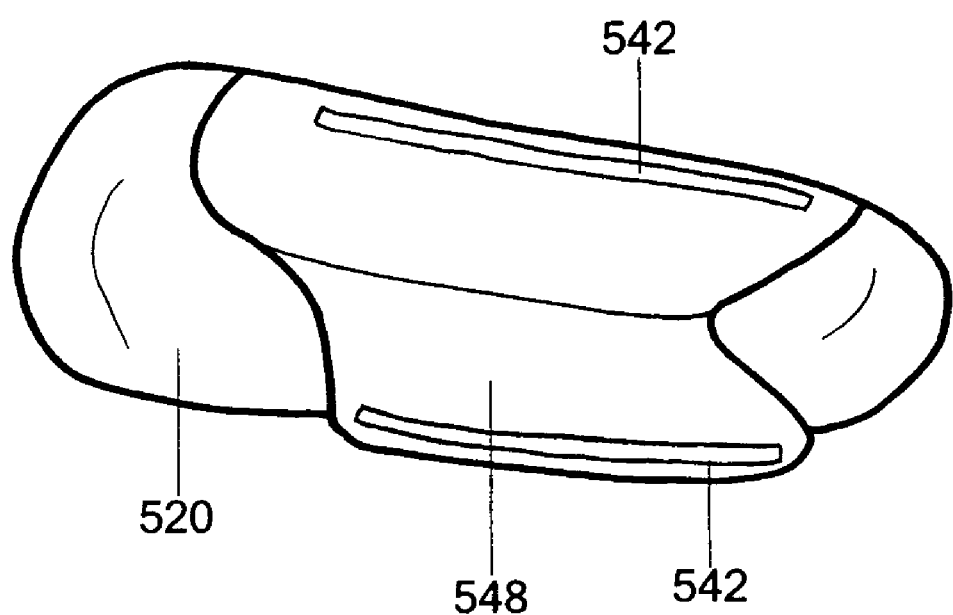

FIG. 5 is a perspective view from the back exterior side of a first embodiment of the present disrailleur invention as would appear when the hook-and-loop type fastener is open, ready to place on a bicycle's drive train elements.

Figure 6A:
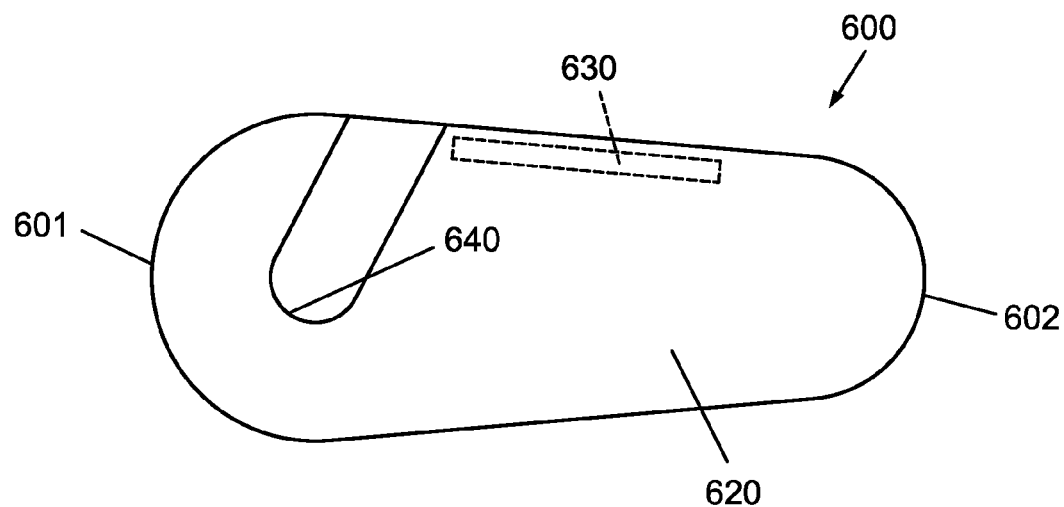

FIG. 6a depicts a first view of an embodiment of a bicycle drive train cover having a single cutout configured to accommodate elements of a bicycle drive train.

Figure 6B:
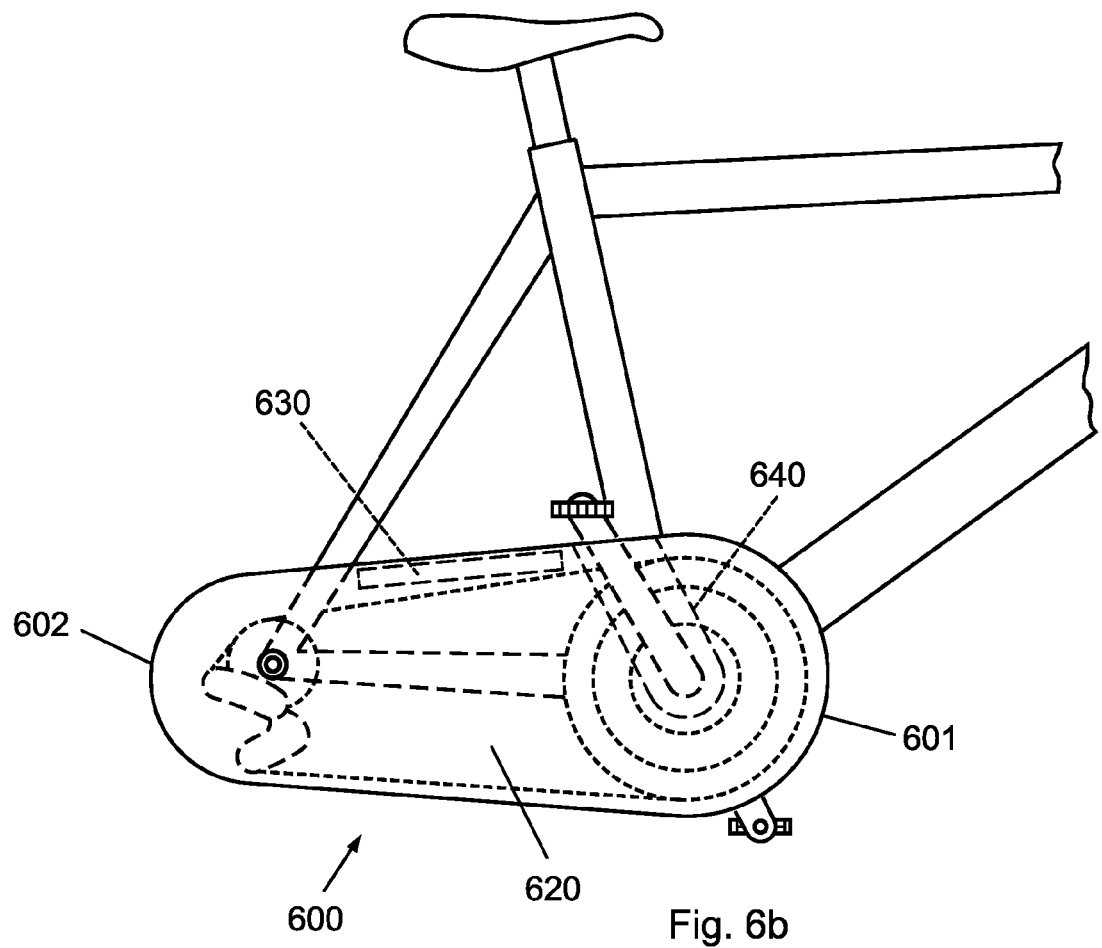

FIG. 6b depicts a second view of the bicycle drive train cover shown in FIG. 6a, the bicycle drive train cover enclosing elements of a bicycle drive train without the rear wheel attached to the bicycle.

REFERENCE NUMERALS

120 Cover
122 Frame
124 Pedals
126 Seat
128 Seat Stay
228 Rear Derailleur Assembly
234 Front Chain Ring
236 Chain
240 Chain Stay
342 Hook-and-loop type fastener
444 Larger U-Shaped Cutout
446 Smaller U-Shaped Cutout
548 Flap
320 Fabric
420 Fabric
442 Fabric
542 Hook-and-loop type fastener
600 Cover
601 First rounded end
602 Second rounded end
620 Flexible material
630 Hook-and-loop type fastener
640 Single U-Shaped Cutout

DETAILED DESCRIPTION

First Embodiment-FIGS. 1-5

Figure 1:
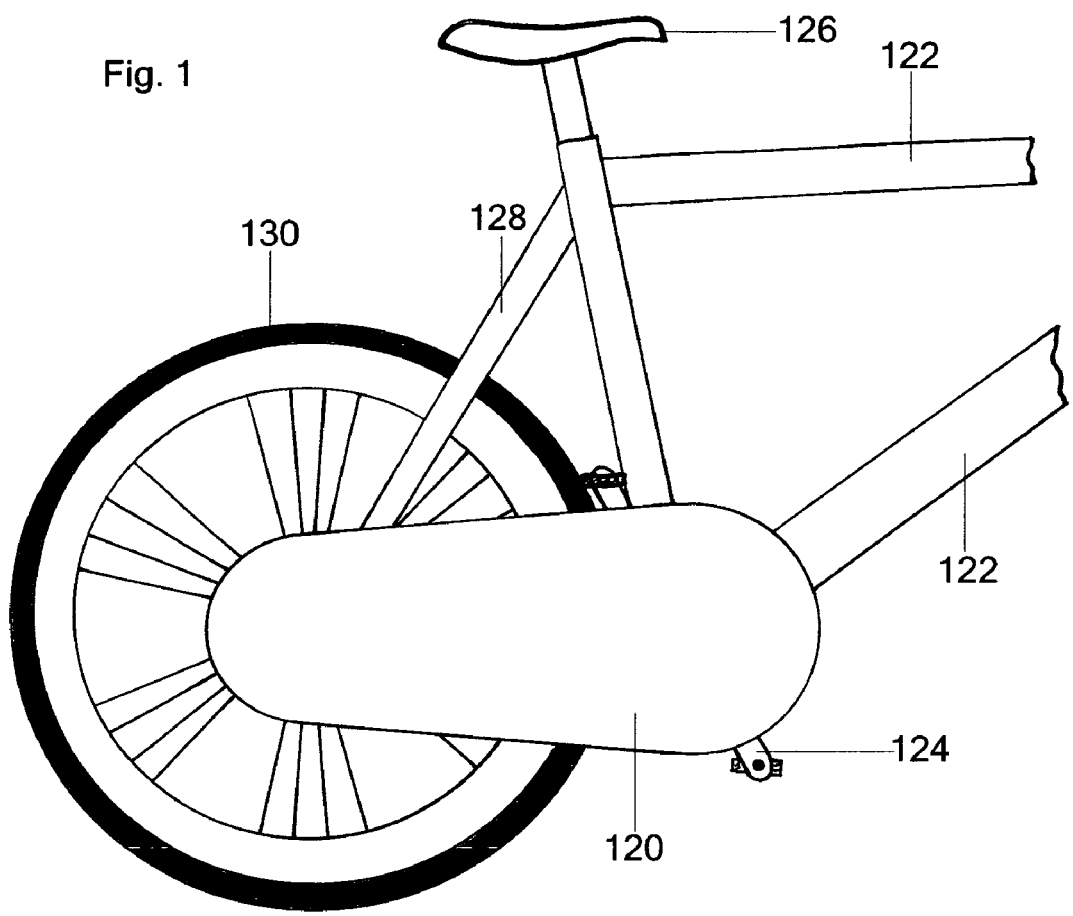
FIG. 1 is an elevational view from the front exterior side of a first embodiment of the present invention as it would appear when secured around a bicycle's drive train elements.

FIG. 1 illustrates the front exterior side of a first embodiment of the invention, a cover (120) which easily attaches to and is removed from the drive train elements of a typical bicycle, having a frame (122), pedals (124), a seat (126), and a seat stay (128). Though FIG. 1 shows the bicycle with the rear wheel (130) attached, the cover works in the same manner and attaches securely and removes easily whether the rear wheel is on or off the bicycle.

Figure 2:
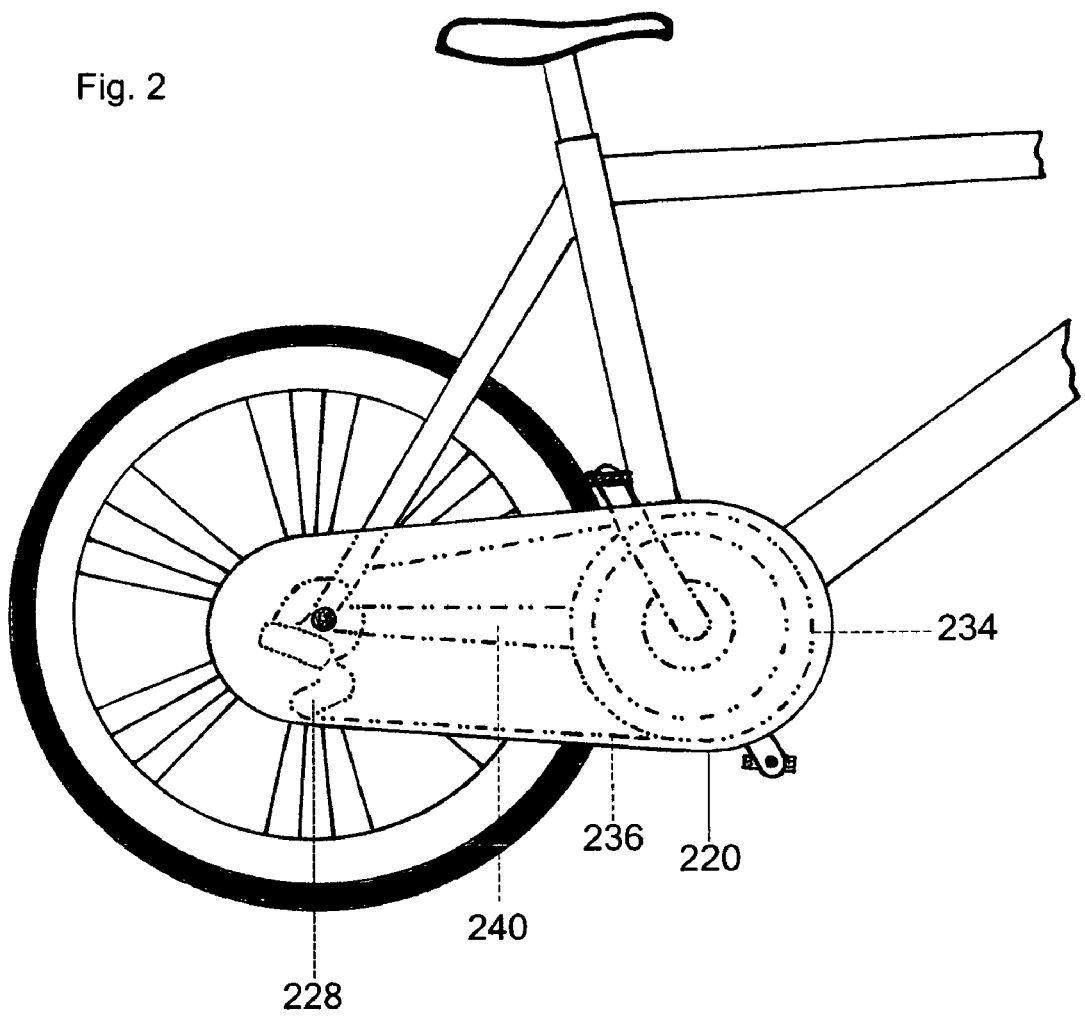
FIG. 2 is also an elevational view from the front exterior side of a first embodiment of the present invention as it would appear when secured around a bicycle's drive train elements, with the small dotted lines indicating the drive train components enclosed within the protective cover, and the larger dotted lines indicating the chain stay.

FIG. 2 also illustrates the front exterior side of a first embodiment of the invention; the cover (120) is shown as it would appear when secured around a bicycle's drive train elements, with the small dotted lines indicating the drive train components that are enclosed within the protective cover, including the front chain ring (234), the chain (236), and the rear derailleur assembly (228), and the larger dotted lines indicating the chain (240)

As shown in FIG. 2, a larger rounded end of the cover is shaped to closely fit, tightly fit, form fit, or otherwise conform to a contour of the bicycle drive train at the front end (220). Also, as shown in FIG. 2, the crank arm is positioned next to the front derailleur and the pedals do not go inside the cover. The oblong envelope can be flat or substantially flat on and off the bicycle.

Figure 3:
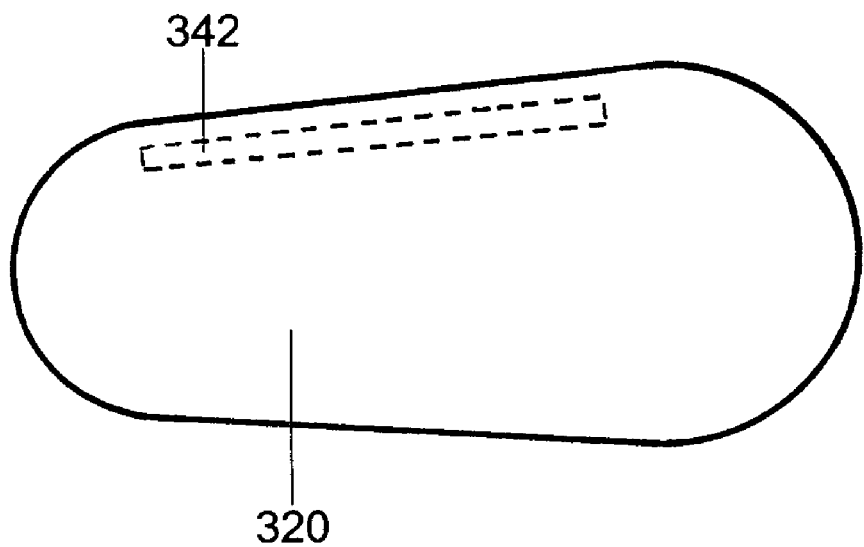
FIG. 3 is an elevational view from the front exterior side of a first embodiment of the present invention, with the dotted lines indicating where hook-and-loop type fastener would be sewn or otherwise attached to the interior of the cover.

FIG. 3 illustrates the front exterior side of an embodiment of the present invention; the cover (120) is shown with the dotted lines on a piece of fabric (320) indicating where hook-and-loop type fastener (342) would be sewn or otherwise attached to the interior of the cover.

FIG. 4 illustrates the back exterior side of an embodiment of the present invention, with the dotted lines indicating where hook-and-loop type fastener (342) would be sewn or otherwise attached to a first piece of fabric (442) and a second piece of fabric (420) in the interior of the cover, and showing the larger U-shaped cutout (444) which allows the cover (120) to slide easily around the front chain ring, and the smaller U-shaped cutout (446) which allows the cover to slide easily around the rear derailleur assembly (228) to enclose the drive train elements.

FIG. 5 illustrates the back exterior side of an embodiment of the present invention as would appear when the hook-and-loop type fastener (542) is opened to create a flap (548) out of a flexible material (520), making the cover (120) ready to place on a bicycle's drive train elements.

The foregoing descriptions of a first embodiment of the invention are not intended to be exhaustive, and many variations are possible and would fall within the scope of the invention. Alternative embodiments of the invention include a cover with a single larger U-shaped cutout (see FIG. 6a), usable when the rear wheel is not attached to a bicycle (see FIG. 6b). Other alternative embodiments of the invention include a cover with differently shaped cut-outs.

OPERATION

First Embodiment-FIGS. 1-5

Placing the cover around the drive train elements of a bicycle is quick and simple, as the cover has only one closure and no moving parts or attachments (e.g., elastic, zippers, ties). As can be discerned from FIGS. 1-5, when the hook-and-loop type fastener (342) is opened as shown in FIG. 5, the flexible fabric/material cover is easily put on to the drive train elements by positioning the larger rounded end of the cover (120) around the front chain ring (234) from underneath. Once the cover is positioned around the front chain ring, it simply must be pulled toward, under, and around the rear derailleur assembly (228) to enclose the drive train elements within the envelope. The cover is quickly and easily secured by bringing the flap (548) up to close by pressing both sides of the hook-and-loop fastener (342) together to enclose the drive train elements completely as shown in FIG. 2. The cover works in the same manner and attaches securely and removes easily whether the rear wheel is on or off the bicycle.

CONCLUSION, RAMIFICATIONS, AND SCOPE

The reader will see that the above embodiments of the single-closure cover can be used to enclose and protect the drive train elements of a bicycle quickly and easily, and can be removed quickly and easily. From the description above, the reader will see that several advantages of some embodiments of the cover are evident:

The cover requires no moving parts such as elastic, zippers, or ties, which can break or wear out with use, and make installation and removal cumbersome and time-consuming.

The cover's single closure eliminates the need to open and close multiple closures, making it extremely quick and efficient to install and remove.

The cover works in the same manner and attaches securely and removes easily whether the rear wheel is on or off the bicycle.

Although the descriptions above contain specific details regarding some embodiments of the invention, the specificities are provided as illustrations and should not be construed as limiting the scope of the embodiments as variations are possible which would fall within the scope of the present invention.

I claim:

1. A bicycle drive train cover, comprising:
   an oblong envelope; and
   a single closure means positioned on a perimeter of the oblong envelope,
   wherein the oblong envelope is flat or substantially flat,
   wherein the single closure means comprises a single hook-and-loop fastener,
   wherein the oblong envelope is configured to enclose a bicycle drive train via the single closure means, and
   wherein the oblong envelope has one or two cutouts configured to accommodate elements of the bicycle drive train.

2. A bicycle drive train cover according to claim 1, wherein the oblong envelope comprises a first rounded end and a second rounded end.

3. A bicycle drive train cover according to claim 2, wherein the first rounded end is larger than the second rounded end.

4. A bicycle drive train cover according to claim 3, wherein the first rounded end of the oblong envelope is shaped to conform to a contour of the bicycle drive train at a front end thereof.

5. A bicycle drive train cover according to claim 1, wherein the two cutouts of the oblong envelope are generally U-shaped.

6. A bicycle drive train cover according to claim 5, wherein the two generally U-shaped cutouts of the oblong envelope have different configurations.

7. A bicycle drive train cover according to claim 1, wherein the single closure means is positioned on the perimeter of the oblong envelope between the two cutouts of the oblong envelope.

8. A bicycle drive train cover according to claim 1, wherein the single closure means is positioned on the perimeter of the oblong envelope adjacent the one cutout of the oblong envelope.

9. A bicycle drive train cover according to claim 1, wherein the oblong envelope is made of a flexible material.

10. A bicycle drive train cover according to claim 9, wherein the flexible material comprises one piece or two pieces of fabric.

11. A bicycle drive train cover according to claim 1, wherein the oblong envelope has no moving parts or attachments.

12. A bicycle drive train cover according to claim 1, wherein the oblong envelope has a single cutout configured to accommodate the elements of the bicycle drive train.

13. A bicycle drive train cover according to claim 12, wherein the single cutout of the oblong envelop is generally U-shaped.

14. A method of covering/uncovering a bicycle drive train, wherein the covering comprises:
    positioning a rounded end of a bicycle drive train cover around a front chain ring of a bicycle drive train from underneath the front chain ring of the bicycle drive train;
    pulling the bicycle drive train cover toward, under, and around a rear derailleur assembly of the bicycle drive train to enclose the bicycle drive train within an oblong envelope of the bicycle drive train cover, wherein a crank arm is positioned next to a front derailleur such that no pedals are inside the oblong envelope; and
    pressing both sides of a hook-and-loop fastener positioned on a perimeter of the oblong envelope to securely enclose the bicycle drive train.

15. A method of according to claim 14, wherein the uncovering comprises:
    pulling apart two sides of the hook-and-loop fastener positioned on the perimeter of the oblong envelope enclosing the bicycle drive train, the oblong envelope having a single closure means constituted by the hook-and-loop fastener;
    pulling the oblong envelope back from under and around a rear derailleur assembly of the bicycle drive train; and
    removing the oblong envelope from around the front chain ring of the bicycle drive train.

16. A method according to claim 15, wherein the uncovering is performed whether a rear wheel is on or off the bicycle.

17. A method according to claim 14, wherein the covering is performed whether a rear wheel is on or off the bicycle.

18. A method according to claim 14, wherein the rounded end of the bicycle drive train cover is shaped to conform to a contour of the bicycle drive train at a front end thereof.

19. A method according to claim 14, wherein the oblong envelope is flat or substantially flat.

20. A method according to claim 14, wherein the oblong envelope has no moving parts or attachments.

* * * * *